United States Patent

Halm

[11] Patent Number: 4,472,245
[45] Date of Patent: Sep. 18, 1984

[54] PROCESS FOR CONTINUOUS THERMAL TREATMENT OF CARBONIZABLE MATERIAL

[75] Inventor: Eduard Halm, Hünibach-Thun, Switzerland

[73] Assignee: Ing. A. Maurer Societe Anonyme, Bern, Switzerland

[21] Appl. No.: 491,163

[22] Filed: May 3, 1983

Related U.S. Application Data

[63] Continuation of Ser. No. 235,612, Feb. 19, 1981, abandoned.

[30] Foreign Application Priority Data

Feb. 26, 1980 [CH] Switzerland .................. 1516/80

[51] Int. Cl.³ ............... C10B 49/00; C10B 49/18; C10B 53/00; C10J 3/18
[52] U.S. Cl. ........................... 201/19; 48/65; 201/25; 201/38
[58] Field of Search ............ 201/19, 25, 34, 38; 48/65, 209, 210; 423/448, 449

[56] References Cited

U.S. PATENT DOCUMENTS

| | | | |
|---|---|---|---|
| 1,282,445 | 10/1918 | McKee | 201/19 |
| 1,380,262 | 5/1921 | Stafford | 201/19 |
| 1,414,401 | 5/1922 | Farup | 201/19 |
| 1,938,124 | 12/1933 | Stevens | 201/19 |
| 2,127,542 | 8/1938 | Stitzer | 48/65 |
| 2,970,953 | 2/1961 | Denig | 201/19 |
| 3,384,467 | 5/1968 | Ammann et al. | 48/65 |
| 4,025,610 | 5/1977 | Suzuki et al. | 13/7 |
| 4,284,616 | 8/1981 | Solbakken et al. | 201/25 |
| 4,287,025 | 9/1981 | Lersmacher | 201/25 |
| 4,357,210 | 11/1982 | Aubry et al. | 201/19 |

FOREIGN PATENT DOCUMENTS 2410235 7/1979 France ........................ 201/19

OTHER PUBLICATIONS

Hackh's, "Chemical Dictionary", Aug. 1976, p. 133, 4th Edition.

*Primary Examiner*—Bradley Garris
*Attorney, Agent, or Firm*—Zarley, McKee, Thomte, Voorhees & Sease

[57] ABSTRACT

Materials which become carbonized at high temperatures, such as wood, cellulose, household refuse, used tires, plastics, tar sand, oil shale, and the like, are subjected to thermal treatment, i.e., pyrolysis or gasification, in an electric shaft furnace having top and bottom electrodes. The material is charged into the furnace at the top and continuously moved downward through the furnace so slowly that as a result of heat transfer from the hotter parts of the furnace, it is carbonized to an extent which renders it electrically conductive by the time it comes in contact with those parts of the electrodes by means of which electric current is conducted through the material. The material charged at the top of the furnace can be caused to move downward by withdrawing suitable amounts of solid material from the bottom of the furnace, for example, or by gasifying the material with steam.

7 Claims, 1 Drawing Figure

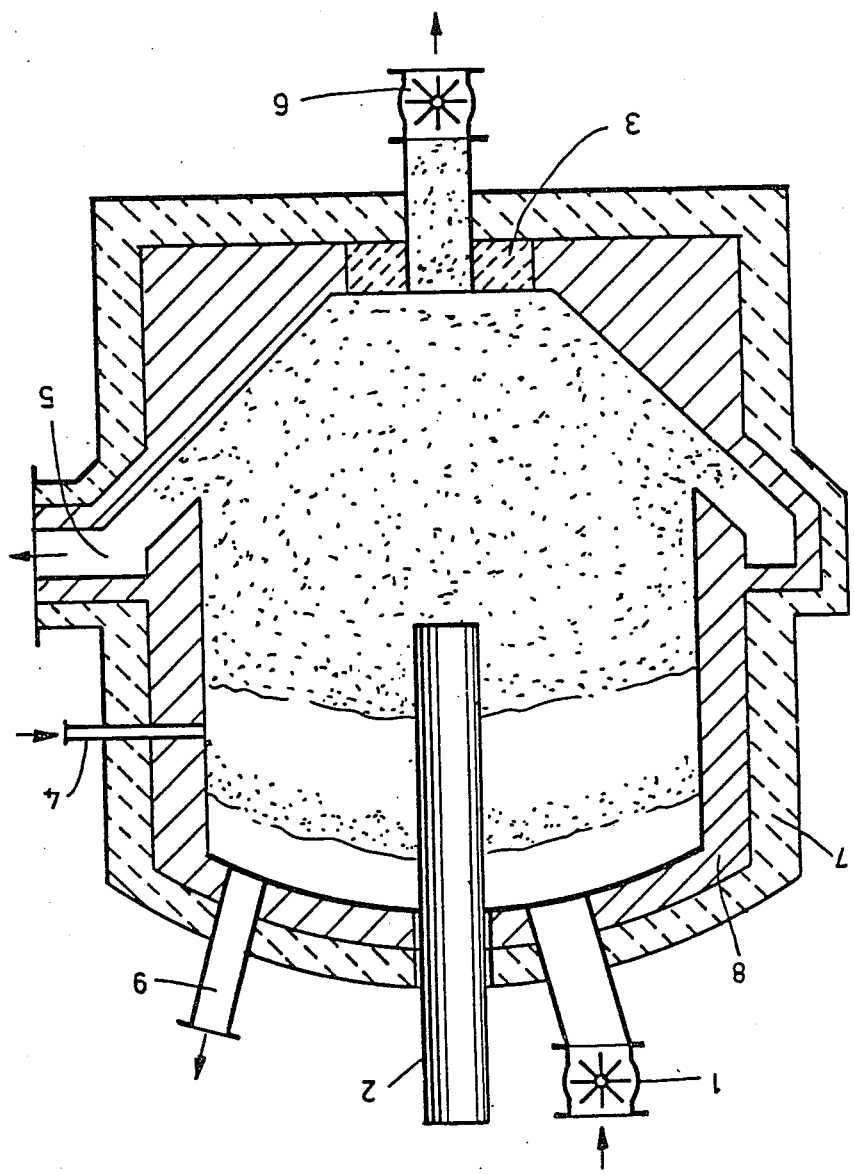

PROCESS FOR CONTINUOUS THERMAL TREATMENT OF CARBONIZABLE MATERIAL

This is a continuation of application Ser. No. 235,615 filed Feb. 19, 1981, now abandoned.

This invention relates to the thermal treatment of materials capable of being carbonized, such as wood, cellulose, paper, plastics, rubber, hydrocarbonaceous mineral substances, and the like.

According to previous methods, such materials have been heated almost exclusively either indirectly in externally fired retorts, or by partial combustion of the material itself, or else by direct heat transfer from hot gases flowing through the material to be heated. Heating by passing electric current through the material has hitherto not been possible because the conductivity of the uncarbonized material is too low.

It is an object of this invention to provide a process for the continuous thermal treatment of carbonizable starting material which is non-conductive when cold, wherein the material is heated by passing an electric current therethrough, and pyrolysis and/or gasification takes place.

To this end, in the process according to the present invention, the material is fed into an electric shaft furnace and moved downward through the furnace so slowly that as a result of heat transfer from the hotter parts of the furnace, it is carbonized until it becomes electrically conductive by the time it comes in contact with the parts of the electrodes by means of which the electric current is passed through the material.

The rate of vertical descent of the material in the shaft furnace can be regulated by removing an appropriate amount of material from the bottom of the furnace, for example, or by gasifying a certain amount of material in the heating zone of the furnace by means of a gasification agent, e.g., water or carbon dioxide. If the rate of vertical descent is too high, the material cannot become carbonized even at least partially on the surface. Thus, it does not become electrically conductive, so that the current supplied by the electrodes is cut off and hence the heating process is interrupted. If, on the other hand, the rate of vertical descent of the material is too low, the furnace is not utilized at optimum efficiency.

In order to set the furnace in operation, the space between the electrodes may first be filled with electrically conductive coal, and the carbonizable material may be slowly preheated; as soon as the proper operating temperature has been reached in the lower part of the furnace, downward movement of the material may be started, e.g., either by withdrawing a suitable amount of material from the bottom of the furnace or by commencing gasification in the heating zone.

The term "thermal treatment" as used in this specification is intended to encompass heating, thermal degasification and gasification.

Thermal treatment according to the process of the present invention may also be accompanied by, among other things, pyrolysis or gasification of materials of the kind initially mentioned, i.e., it may be used, say, for charcoal burning, for pyrolytic decomposition of cellulose, paper, household waste, scrap plastic, or used tires, for processing oil shale or oil sand, etc., or if a gasification agent such as water or carbon dioxide is introduced, for producing fuel gas or synthesis gas.

Suitable furnaces for carrying out the process according to the invention are basically both single-phase and three-phase electric furnaces in which the at least partially carbonized material is heated between electrodes by means of a direct flow of current.

Preferred embodiments of the invention will now be described in detail with reference to the accompanying drawing, the sole FIGURE of which is a longitudinal section through a shaft furnace.

EXAMPLE 1

In order to gasify wood completely for the purpose of producing a gas which contains approximately 50% $H_2$ and 50% CO and is suitable, for instance, as synthesis gas in the production of methanol, dried wood is charged into the electric shaft furnace shown in the drawing FIGURE through a feeder 1. The size of the pieces of wood is about 3–5 cm edge length. Between a top electrode 2 and a bottom electrode 3, direct current flows through the at least partially carbonized wood, whereupon heat is generated. The temperature in the lower part of the furnace is kept at a minimum of 800° C. Steam is introduced into the furnace through a pipe connection 4 and reacts with the charcoal in the lower part of the furnace, forming $H_2$ and CO. Charcoal is consumed by this reaction, so that the wood charged into the top of the furnace continuously sinks, is heated during its descent by the transfer of heat from both the hotter material lying below it and from the hotter parts of top electrode 2, and is at least partially superficially charred to such an extent that it becomes electrically conductive by the time it comes in contact with the current-supplying end of top electrode 2 at the latest. The gases, including the gaseous decomposition products of the wood, flow downward through the charcoal, heated to at least 800° C., and leave the furnace through an annular gas duct 5 as a gas mixture of about 50% $H_2$ and 50% CO. The wood ash can be evacuated from the furnace at the bottom through a discharge gate 6. The body of the furnace consists of a steel shell 7 lined on the inside with refractory material 8.

A furnace having an inside diameter of about 2,200 mm and an electrode spacing of about 3,500 mm can take a load of about 30,000 amps at about 100 V, which represents a power consumption of 3,000 kW. Some 4,000 kg of wood per hour are then consumed and about 3,000 m³ of gas (STP) produced. With this output, the rate of vertical descent of the wood in the upper part of the furnace is so low that partial carbonization makes the wood sufficiently conductive by the time it comes in contact with the current-supplying end of electrode 2.

EXAMPLE 2

For complete gasification of household waste with recovery of a gas which contains approximately 50% $H_2$ and 50% CO and is suitable, for instance, as synthesis gas in the production of methanol, dried refuse of the following composition, among other things, is charged into the top of the furnace shown in the drawing FIGURE (percentages by weight):
  old newspapers: 38.5%
  old magazines: 12.8%
  kitchen refuse: 2.6%
  plastics: 5.1%
  textiles: 2.5%
  sand: 18.0%
  glass: 2.05%

Between top electrode 2 and bottom electrode 3, DC or single-phase AC flows through the at least partially carbonized refuse, whereupon heat is generated. The temperature in the lower part of the furnace is kept at a minimum of 800° C. Steam is introduced into the furnace through pipe connection 4 and reacts with the carbon of the refuse in the lower part of the furnace, forming $H_2$ and CO. The slag can be discharged from the bottom of the furnace in solid or liquid form. The refuse fed into the furnace at the top continuously sinks, is heated during its descent both by the hotter material lying below it and by the hotter parts of top electrode 2, and is thereupon carbonized to such an extent that it becomes electrically conductive by the time it comes in contact with the current-supplying end of top electrode 2. The gases, including the gaseous decomposition products of the refuse, flow downward through the refuse, which is heated to at least 800° C. and is at least partially carbonized, and leave the furnace through annular gas duct 5 as a gas mixture of about 50% $H_2$ and 50% CO.

A furnace having an inside diameter of about 2,200 mm and an electrode spacing of about 3,500 mm can take a load of about 30,000 amps at about 100 V, which represents a power consumption of about 3,000 kW. Some 8 metric tons of dry refuse per hour are then gasified.

EXAMPLE 3

Scrap tires are charged into the top of the furnace shown in the drawing FIGURE to be pyrolyzed. Between top electrode 2 and bottom electrode 3, DC or single-phase AC flows through the coke produced during pyrolysis, whereupon heat is generated. The temperature in the lower part of the furnace is kept at a minimum of 600° C. The pyrolysis coke produced is evacuated from the furnace at the bottom together with the ashes, through discharge gate 6. As a result of the pyrolysis and the evacuation of the coke, the scrap tires fed in at the top are caused to sink continuously, are heated during their descent by the transfer of heat from both the hotter material lying below them and by the hotter parts of top electrode 2, and are at least partially carbonized to such an extent that they become electrically conductive by the time they come in contact with the current-supplying end of top electrode 2 at the latest. The gaseous decomposition products flow upward and leave the furnace through a pipe connection 9.

A furnace having an inside diameter of about 2,000 mm and an electrode spacing of about 3,000 mm can take a load of about 20,000 amps at 80 V, which represents a power consumption of 1,600 kW. In such a furnace, some 2 metric tons of scrap tires per hour can be pyrolyzed.

The carbonizable starting material, e.g., wood or refuse, may also contain moisture, so that the starting material is gasified together with the steam expelled from it and with the other gaseous decomposition products.

What is claimed is:

1. A process for the continuous treatment of initially non-conductive and non-carbonized carbonizable starting material, comprising the steps of:
    charging the material into the top of an electric shaft furnace containing electrodes at the top and bottom thereof,
    causing the material to move continuously downward through the furnace while coming in contact with the electrodes thus subjecting the material to the transfer of heat from parts of the furnace and causing the material to become at least partially carbonized during its descent,
    regulating the rate of vertical descent of the material in such a way that the degree of carbonization attained is sufficient to render the material electrically conductive when it comes in contact with the current-transmitting portions of the electrodes, and
    causing an electric current to flow through the conductive material via the electrodes in order to heat the material so that the material becomes carbonized and is gasified together with steam fed into the furnace at the top from outside and/or expelled from the material, and the gases, including the gaseous decomposition products of the material, flow downward through the furnace to be exhausted at the bottom thereof, the current supply and thus the generation of heat being so adjusted that a gasification temperature of approximately 800° C. is maintained in the furnace, and the rate of vertical descent of the material in the upper part of the furnace, dependent upon the rate of gasification, does not become so high that the electric contact between the electrodes is cut off.

2. The process of claim 1, wherein moist wood is used as the starting material, the wood being gasified with the steam expelled therefrom and with the other gaseous decomposition products of the wood.

3. The process of claim 1, wherein moist refuse is used as the starting material, the refuse being gasified with the steam expelled therefrom and with the other gaseous decomposition products of the refuse.

4. The process of claim 1, wherein plastic scrap is used as the starting material, the plastic scrap being gasified together with steam fed into the furnace at the top from outside.

5. The process of claim 1, wherein dry wood is used as the starting material, the wood being gasified together with steam fed into the furnace at the top from outside.

6. The process of claim 1, wherein dried refuse is used as the starting material, the refuse being gasified together with steam fed into the furnace at the top from outside.

7. The process of claim 1, wherein scrap tires are used as the starting material, the scrap tires being gasified together with steam fed into the furnace at the top from outside.

* * * * *